United States Patent [19]

Buonomo et al.

[11] 4,013,589
[45] Mar. 22, 1977

[54] PROCESS FOR THE PREPARATION OF MATERIALS HAVING IMPROVED MECHANICAL PROPERTIES AND MATERIALS OBTAINED THEREBY

[75] Inventors: Franco Buonomo; Vittorio Fattore; Bruno Notari, all of San Donato Milanese, Italy

[73] Assignee: Snam Progetti S.p.A., Milan, Italy

[22] Filed: Oct. 31, 1974

[21] Appl. No.: 519,791

[30] Foreign Application Priority Data

Sept. 19, 1974  Italy .................................. 27455/74

[52] U.S. Cl. .......................................... 252/455 R
[51] Int. Cl.$^2$ ........................................ B01J 29/06
[58] Field of Search ................ 252/451, 453, 455 R

[56] References Cited

UNITED STATES PATENTS

| | | | |
|---|---|---|---|
| 2,852,473 | 9/1958 | Welling | 252/451 |
| 3,416,888 | 12/1968 | Notari | 252/463 X |
| 3,535,232 | 10/1970 | Lawrance et al. | 252/455 R |

*Primary Examiner*—Carl F. Dees
*Attorney, Agent, or Firm*—Ralph M. Watson

[57] ABSTRACT

The mechanical and thermal properties of aluminum oxide, such as γ alumina, adapted for use as a catalyst or catalyst carrier are improved through a treatment thereof with a silicon compound containing hydrolyzable radicals, such as methyl orthosilicate, in which the aluminum compound is impregnated with the silicon compound or a solution thereof in a compatible organic solvent whose boiling point is lower than the boiling point of the silicon compound. The impregnated aluminum oxide is slowly brought to the boiling temperature of the silicon compound in an inert atmosphere so as to cause silicon compound to react with the aluminum oxide and to distill off reaction products and excess silicon compound. The hydrolyzable groups bound to the silicon compound on the aluminum oxide are then reacted with water and distilled off.

4 Claims, No Drawings

PROCESS FOR THE PREPARATION OF MATERIALS HAVING IMPROVED MECHANICAL PROPERTIES AND MATERIALS OBTAINED THEREBY

The present invention relates to an improved process for obtaining materials of high thermal and mechanical stability which are constituted by aluminum oxides selected from γ-alumina, ε-alumina, δ-alumina θ-alumina. In the Italian Patent Application No. 30787 A/73 of Oct. 31, 1973 in the name of the same Applicant, and our corresponding U.S. application, Ser. No. 519,792, filed Oct. 31, 1975, there are described materials, having a high mechanical and thermal stability, obtained by treating the oxides of aluminum, whose mechanical characteristics had to be improved, with a silicon compound and by subjecting the product obtained thereby to drying and to a controlled oxidation.

The products, obtained according to the process of the aforesaid application, have characteristics of mechanical and thermal stability which are very superior to the starting materials.

However materials having good characteristics are obtained only through a controlled oxidation of the organic product bound to the material surface, since the uncontrolled oxidation causes modifications of the material, which is to be treated, due to local temperature increases during the treatment. Such drawbacks are more serious when the silicon compound which is used contains organic radicals and halogens, since the temperature increase during the oxidation, together with halogen containing compounds which are formed, affects the material to be treated so as to remarkably decrease the mechanical and thermal characteristics thereof.

It has now been found that it is possible to obtain materials having high thermal and mechanical characteristics, without the aforesaid drawbacks occurring, through a simple and economical process comprising the following stages:

a. impregnation of the material with a silicon compound containing hydrolyzable radicals b. removal of excess reaction products and of the silicon compound c. hydrolysis of the silicon compound bound to the material and removal of the hydrolysis products.

The process that we have invented makes it possible to achieve two ends. On the one hand it is possible to dispense with the oxidation of the organic compounds on the material surface and the consequent local overheatings which reduce the mechanical and thermal characteristics of the product, on the other hand the organic material may be recovered which, sometimes, may be utilized for obtaining the silicon compounds. As hydrolyzable silicon products, the following are mentioned: silicic acid tetraesters such as methyl orthosilicate, ethyl orthosilicate, n-propyl orthosilicate, isopropyl orthosilicate, n-butyl orthosilicate, sec-butyl orthosilicate, iso butyl orthosilicate, n-pentyl orthosilicate, isoamyl orthosilicate, hexyl orthosilicate, ethyl-butyl orthosilicate, octyl orthosilicate, phenyl orthosilicate, benzoyl orthosilicate; halogen containing esters of orthosilicic acid such as monochloro, and monofluoro-methyl, ethyl, propyl and butyl esters of orthosilicic acid; dichloro-dibromo and difluoro-methyl, ethyl, propyl, butyl esters of orthosilic acid; trichloro-tribromo and trifluoro-methyl, ethyl, propyl and butyl esters of orthosilic acid; and organic silicon salts such as silicon tetraacetate, etc.

The hydrolysis of the organic silicon compound bound to the treated material may be carried out at temperatures in range of from room temperature to 500° C.

Such hydrolysis may be carried out under pressure and (or) use may be made of superheated steam.

Sometimes it is advantageous to add agents favouring the hydrolysis, such as acids or bases.

The impregnation method has already been described in the foregoing patent application and will only be mentioned in the present specification.

The impregnation may be carried out in the liquid phase in the presence, or not, of silicon compound solvents at the atmospheric or super atmospheric pressure and at temperatures in range of from room temperature to 300° C, or the treatment may be carried out in the vapour phase by passing a stream of the silicon compound onto the material which is to be treated.

Also the removal of the reaction products and the excess silicon compound is carried out according to the technique disclosed in the aforesaid patent application.

The following examples illustrate the invention without being limitative thereof.

More particularly the following examples refer to the stabilization of γ-alumina which is used as catalyst carrier for many chemical reactions carried out on an industrial scale and to the stabilized aluminas which show, after heating at 1200° C for 24 hours, only the change from the γ phase to the δ phase. Said stabilized aluminas, after a treatment for 40 hours at 250° C at a steam pressure of 15 atmospheres, keep unchanged their crystalline structure, their exceptional mechanical and thermal properties, and the surface area. Moreover γ-alumina stabilized according to the invention, after a treatment at 1100° C for 24 hours, shows a volume shrinkage lower than 20%.

EXAMPLE 1-8

100 g of spheroidal gamma alumina, having a total pore volume equal to 0.8 cc/g, were immersed in 200 cc of silicon organic derivative and kept in contact with the liquid for 30 minutes. The solid was separated from the excess liquid and was transferred into a glass tubular reactor immersed in an electric oven: a light nitrogen stream was sent and the whole was slowly heated up to the boiling temperature of the silicon derivative so as to completely distill off the products obtained by reacting alumina and silicon organic derivative, and the unreacted excess thereof.

Then nitrogen was fed together with steam and the temperature was held at 200° C.

The hydrolyzable groups bound to silicon reacted with water and were distilled and condensed outside the reactor.

When the reaction ended and, only water condensed outside, the steam feed was stopped and the so prepared sample was cooled. The silicon organic derivatives that were employed and the distillation temperature are reported in the table.

Alumina, prepared as abovesaid, was examined and we determined the resistance against abrasion, before and after thermal treatment at 1100° C for 24 hours, the volume shrinkage and the changes of surface area after analogous treatment.

The table reports also the results of the X ray examination of the same samples after treatment at 1200° C for 24 hours.

The determination of the resistance against abrasion was carried out by using a steel container, having an 18 cc volume, which was 80% filled with the material under examination.

A high frequency vibration for 30 minutes was given to said container by suitable apparatus.

Before the tests were begun, the sample under examination, kept in an oven at 150° C for 2 hours, was cooled to room temperature in an anhydrous atmosphere and then weighed with great care. At the end of the abrasion tests, the recovered sample was sieved through a sieve removing the granule fractions, blown by air in order to remove the powder adhering to the little spheres, again dried at 150° C for 20 hours and then weighed.

The friction resistance (K) was expressed as percentage weight loss of the sample.

The results obtained from the determinations are reported in the same table.

Example 8 refers to alumina as such and is reported for the sake of comparison.

The two samples so prepared, after dehydration under vacuum by 450° C, were examined at I.R.

In the first case an adsorption spectrum was obtained typical of silica, wherein a very clean band was visible at 3745 cm$^{-1}$, awarded the Si—OH group, the bands at 3737 and 3795 cm$^{-1}$ disappeared and the band at 3698 cm$^{-1}$ remarkably lowered, all awardable to Al—OH band.

In the second case an adsorption overlapping spectrum was obtained, typical of a silica and alumina mixture, wherein various gases were prevailing.

What we claim is:

1. The process of improving the mechanical and thermal properties of aluminum oxide adapted for use as a catalyst or catalytic carrier which comprises impregnating said aluminum oxide with a silicon compound containing hydrolyzable radicals selected from the group consisting of the tetraesters of silicic acid, the halogen containing esters of orthosilicic acid and the organic silicon salts, slowly heating said impregnated aluminum oxide to the boiling temperature of said silicon compound in an inert atmosphere so as to react the silicon compound with the aluminum oxide and to distill off reaction products and excess silicon compound, and then reacting the hydrolyzable radicals bound to the silicon compound on said aluminum oxide with water in a closed vessel so as to hydrolyze said hydrolyzable radicals and distilling off vapors from said vessel and condensing said vapors outside the vessel until only water is condensed.

2. Process according to claim 1, wherein the hydrolysis of the silicon compound is carried out in the temperature range of from room temperature to 500° C.

3. Process according to claim 1, wherein the hydrolysis is carried out under pressure and/or in the presence of superheated steam.

4. Process according to claim 1 wherein the hydrolysis is carried out in the presence of an acid or a base.

Table:

| Example | Compound | B.P. °C | Measurements before sinterization S.A. m²/g | K % | Measurements on the sinterized compound at 1100° C for 24 hours S.A. m²/g | K % | ΔV % |
|---|---|---|---|---|---|---|---|
| 1 | $(C_2H_5O)_4Si$ | 169 | 198 | 2.1 | 145 | 1.4 | 4 |
| 2 | $(CH_3O)_4Si$ | 121 | 192 | 2.7 | 139 | 1.2 | 2 |
| 3 | $(C_3H_7O)_4Si$ | 227 | 204 | 1.9 | 142 | 0.9 | 4 |
| 4 | $(n-C_4H_9O)_4Si$ | 275 | 208 | 2.3 | 136 | 1.1 | 4 |
| 5 | $(C_2H_5O)_3SiCl$ | 135 | 196 | 2.9 | 124 | 1.6 | 5 |
| 6 | $(C_2H_5O)_2SiF_2$ | 83 | 205 | 2.2 | 118 | 1.7 | 5 |
| 7 | $(C_2H_5O)_3SiOSi-(OC_2H_5)_3 + (C_2H_5O)_4Si$ | 169 | 201 | 1.5 | 140 | 1.1 | 4 |
| 8 | — | — | 196 | 3.2 | 68 | 9.3 | 14 |

Where S.A. means the surface area, ΔV is the volume shrinkage expressed as percent and K is the friction resistance expressed as per cent of scraped material.

| Example | RX after treatment at 1200° C |
|---|---|
| 1 | delta |
| 2 | n.d. |
| 3 | n.d. |
| 4 | n.d. |
| 5 | delta |
| 6 | n.d. |
| 7 | delta |
| 8 | alpha |

EXAMPLE 9

By employing alumina of example 8 we prepared two tablets suitable to be examined by I.R. The first tablet was treated with ethyl orthosilicate according to example 1.

The second one was treated with colloidal silica Ludox S.M. (DuPont) in the following way: 7g of colloidal silica at 30% were diluted in 80 cc of $H_2O$; the resulting solution was employed for impregnating 100 g of alumina.

After drying at 120° C for 12 hours and calcination at 500° C in air, an alumina was obtained containing 1.6% $SiO_2$.

UNITED STATES PATENT AND TRADEMARK OFFICE
CERTIFICATE OF CORRECTION

PATENT NO. : 4,013,589
DATED : March 22, 1977
INVENTOR(S) : Franco Buonomo, et al It is certified that error appears in the above-identified patent and that said Letters Patent are hereby corrected as shown below:

Column 1, line 67, After "tribromo" insert a dash -- - --.

Column 4, line 5, After "awarded" insert --to--.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*